(12) United States Patent
Wang et al.

(10) Patent No.: US 12,416,358 B2
(45) Date of Patent: Sep. 16, 2025

(54) METHOD FOR CONTROLLING A HYDROSTATIC DRIVE

(71) Applicant: Robert Bosch GmbH, Stuttgart (DE)

(72) Inventors: Ximing Wang, Neu-Ulm (DE); Salih Tetik, Nersingen (DE); Lukas Linder, Langenau (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 18/563,789

(22) PCT Filed: May 20, 2022

(86) PCT No.: PCT/EP2022/063779
§ 371 (c)(1),
(2) Date: Nov. 22, 2023

(87) PCT Pub. No.: WO2022/248367
PCT Pub. Date: Dec. 1, 2022

(65) Prior Publication Data
US 2024/0301949 A1    Sep. 12, 2024

(30) Foreign Application Priority Data
May 25, 2021 (DE) .................. 10 2021 205 295.9

(51) Int. Cl.
*F16H 61/421* (2010.01)
*F16H 61/4148* (2010.01)
(Continued)

(52) U.S. Cl.
CPC ....... *F16H 61/421* (2013.01); *F16H 61/4148* (2013.01); *F16H 61/4183* (2013.01); *F16H 61/431* (2013.01)

(58) Field of Classification Search
CPC ............... F16H 61/421; F16H 61/4148; F16H 61/4183; F16H 61/431
See application file for complete search history.

(56) References Cited

U.S. PATENT DOCUMENTS 4,689,956 A * 9/1987 Hein .................. F16H 61/47
60/449
4,726,187 A * 2/1988 Reinhardt ............ F04B 49/08
388/906

(Continued)

FOREIGN PATENT DOCUMENTS

DE        37 13 799 A1    11/1988
DE    10 2019 219 206 A1    1/2021
(Continued)

OTHER PUBLICATIONS

International Search Report corresponding to PCT Application No. PCT/EP2022/063779, mailed Aug. 30, 2022 (German and English language document) (6 pages).

*Primary Examiner* — Dustin T Nguyen
(74) *Attorney, Agent, or Firm* — Maginot, Moore & Beck LLP (57) ABSTRACT

A method for controlling a drive, which has a first hydraulic machine coupled to a drive machine and a second hydraulic machine coupled to an output to change one of the hydraulic machines from a pump operation to a motor operation and the other of the hydraulic machines from a motor operation to a pump operation includes controlling the pivoting angle of the other hydraulic machine so that the pivoting angle goes from a positive start pivoting angle to a negative target pivoting angle or from a negative start pivoting angle to a positive target pivoting angle. The control of the pivoting angle of the other hydraulic machine between the start pivoting angle and the target pivoting angle is limited such that the pivoting speed of the pivoting angle of the second hydraulic machine does not exceed a predefined value.

9 Claims, 5 Drawing Sheets

(51) Int. Cl.
*F16H 61/4183* (2010.01)
*F16H 61/431* (2010.01)

(56) References Cited

U.S. PATENT DOCUMENTS

| | | | | |
|---|---|---|---|---|
| 4,747,268 A | * | 5/1988 | Reinhardt | F04B 49/06 60/426 |
| 5,042,251 A | * | 8/1991 | Berthold | F16H 61/431 60/489 |
| 5,070,695 A | * | 12/1991 | Metzner | F16H 61/46 60/449 |
| 5,540,048 A | | 7/1996 | Larkin et al. | |
| 5,628,188 A | * | 5/1997 | Kordak | F04B 1/08 60/449 |
| 6,182,448 B1 | * | 2/2001 | Ohkura | F16H 61/4148 60/494 |
| 6,912,803 B2 | | 7/2005 | Ichimura | |
| 6,915,631 B2 | * | 7/2005 | Kado | F16H 61/438 60/423 |
| 2010/0024409 A1 | * | 2/2010 | Shiina | F16H 61/431 60/420 |

FOREIGN PATENT DOCUMENTS

| | | |
|---|---|---|
| JP | S64-3303 A | 1/1989 |
| JP | H9-301016 A | 11/1997 |

\* cited by examiner

METHOD FOR CONTROLLING A HYDROSTATIC DRIVE

This application is a 35 U.S.C. § 371 National Stage Application of PCT/EP2022/063779, filed on May 20, 2022, which claims the benefit of priority to Serial No. DE 10 2021 205 295.9, filed on May 25, 2021 in Germany, the disclosures of which are incorporated herein by reference in their entirety.

BACKGROUND

A generic drive has two hydraulic machines connected in an open hydraulic circuit with a displacement volume that can be adjusted to zero. A first one of the hydraulic machines can be coupled to a drive machine, for example a combustion drive or an electric machine, the second one to an output, for example a transmission or an axle. For example, the drive is a traction drive for a mobile work machine.

Control is carried out electrically/electronically via a control unit, preferably such that the working pressure of the drive is controlled by adjusting the displacement volume of the first hydraulic machine and the output torque by adjusting the displacement of the second hydraulic machine.

When reversing or decelerating the traction drive, the direction of the torque on the output-side unit must be changed. This is done by pivoting the pivoting cradle in the other direction. This changes the direction of flow of the fluid. For example, when changing from acceleration to deceleration of the vehicle, the fluid on the output-side unit is no longer drawn from the common pressure line between pump and motor, and conveyed into the tank line, but drawn from that tank line and conveyed into the common pressure line. In this state, the output-side unit changes from motor operation to pump operation. Failure to operate the unit properly may result in damage.

One phenomenon is cavitation. As the oil column in the suction line must be accelerated, this process must not be too dynamic. The cavitation at the suction port of the motor is dependent on the speed, pivoting angle, and pivoting speed.

In contrast, the object of the disclosure is to create a method for controlling the drive, via which the cavitation can be effectively prevented during reversing or decelerating.

SUMMARY

A hydrostatic drive, in particular a traction drive of a mobile work machine, has at least two hydraulic machines, of which at least a first hydraulic machine can be coupled to a drive machine and at least a second hydraulic machine can be coupled to a drive, in particular is coupled. They are fluidically connected, particularly in an open hydraulic circuit via a working line and also to a pressure medium sink, in particular a tank. Both may operate in pump operation and in motor operation as required. They are each designed with a displacement volume that can be adjusted for an efficient, demand-oriented pressure medium supply. In order to enable a change between motor and pump operation or a direction change of the torque, each of their displacement volumes can be adjusted to values left and right of zero. In particular, they are each configured as an axial piston machine in a swashplate design with a pivotable swashplate.

To adjust the displacement volume, the hydraulic machines each comprise at least one electrohydraulic adjustment unit. In the case of the swashplate design, the respective swashplate is guided therefrom. The respective electrohydraulic adjustment unit is effective in an adjustment direction and for this purpose comprises an electrically and/or electronically controllable valve device, via which a set pressure space of an actuator cylinder of this adjustment unit can optionally be connected to the working line and to a low pressure, and in intermediate positions in particular to both. In particular, a control unit of the drive is configured such that the working pressure in the working line can be regulated via the adjustment of the hydraulic machine that can be coupled to the drive machine, which is controlled by it, and a torque on the output can be controlled via the adjustment of the hydraulic machine that can be coupled to the output, which is controlled by it, and a displacement volume of the hydraulic machine there can be regulated. In particular, a respective actual value of the working pressure and the latter displacement volume is detected and electronically fed back to the control unit.

This concept of electronic feedback of the respective control variable, instead of hydraulic-mechanical feedback, is known from the Applicant's product range as the so-called "Electronified Open Circuit" or "EOC" hydraulic machine. Such a hydraulic machine is described in the application DE 10 2019 120 333 A1. A target torque on the output can in particular be transferred from a higher-level drive strategy, in particular a travel strategy, to the control unit. Such a drive is in particular known as a secondary controlled drive in an open hydraulic circuit.

In the method, one of the hydraulic machines (preferably the first hydraulic machine) is changed from a pump operation to a motor operation, and the other of the hydraulic machines (preferably the second hydraulic machine) is changed from a motor operation to a pump operation.

In the method, the pivoting angle of the output-side hydraulic machine is controlled, such that the pivoting angle goes from a positive start pivoting angle to a negative target pivoting angle or from a negative start pivoting angle to a positive target pivoting angle.

In this method, control of the pivoting angle of the output-side hydraulic machine between the start pivoting angle and the target pivoting angle is limited, such that the pivoting speed of the pivoting angle of the second hydraulic machine does not exceed a predefined value.

BRIEF DESCRIPTION OF THE DRAWINGS

The present disclosure is described with reference to the accompanying figures, wherein the same reference numbers refer to the same parts and/or similar parts and/or corresponding parts of the system. Regarding the figures.

DETAILED DESCRIPTION

In the following, the present disclosure is described with reference to certain embodiments as shown in the accompanying figures. Nonetheless, the present disclosure is not limited to the particular embodiments described in the following detailed description and shown in the figures, but the described embodiments merely illustrate some aspects of the present disclosure.

Further changes and variations of the present disclosure are clear to those skilled in the art. The present description thus encompasses any amendments and/or variations of the present disclosure.

Figure 1:
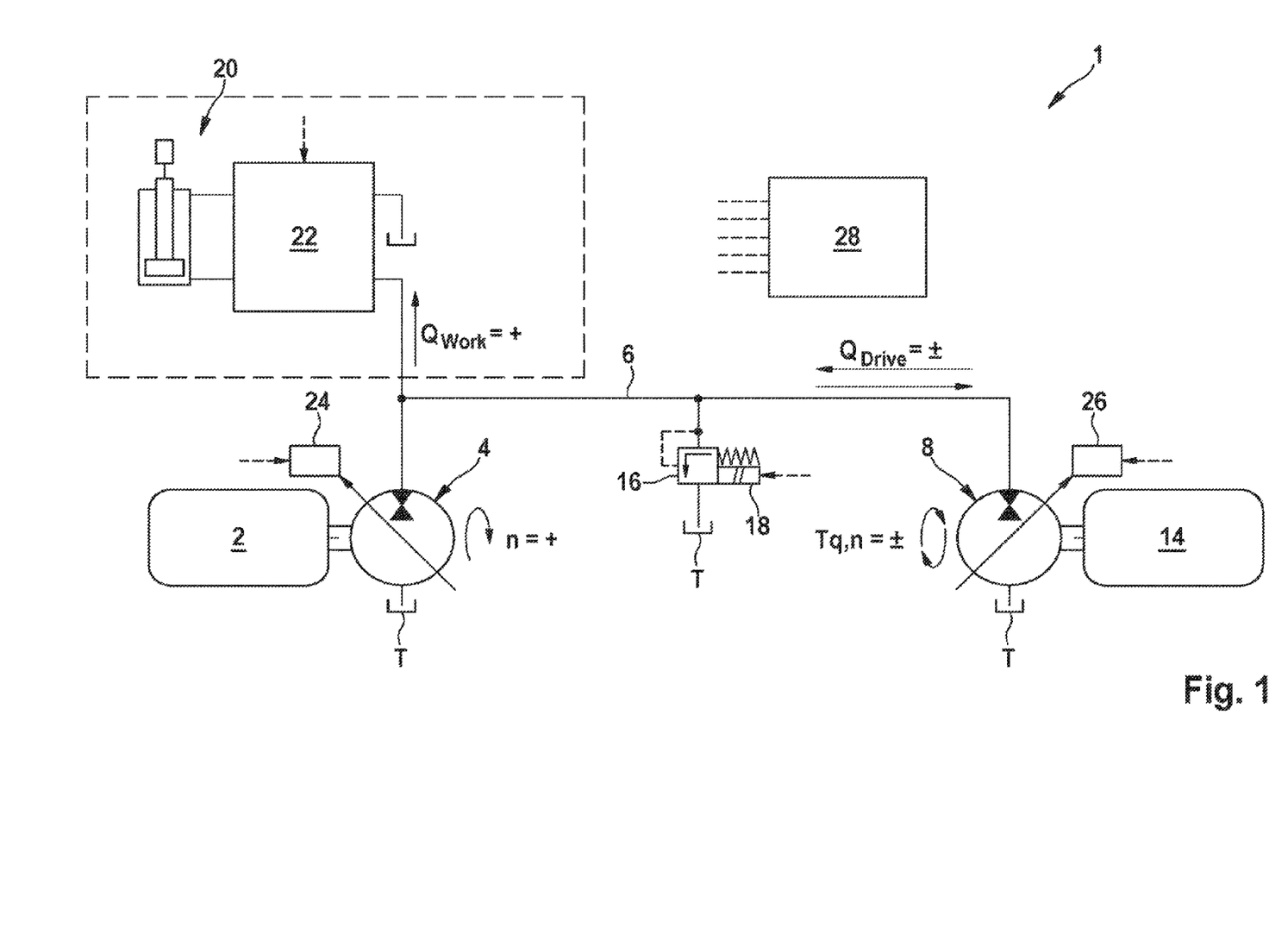
FIG. 1 schematically shows a circuit diagram of a hydrostatic drive configured as a traction drive in accordance with an exemplary embodiment of the present disclosure.

According to FIG. 1, a hydrostatic drive 1 configured as a traction drive has a first hydraulic machine 4 coupled to a drive machine 2 and a second hydraulic machine 8 fluidically connected thereto via a working line 6. The hydraulic machines 4, 8 each have an electrohydraulic adjustment unit 24, 26, via which their displacement volume can be adjusted. The second hydraulic machine 8 is coupled to an output-side transmission 14.

The respective hydraulic machine is in particular designed as an EOC or "Electronified Open Circuit" pump known from the Applicant's product range. The drive 1 is protected from positive pressure via a pressure relief valve 16, the target limit pressure of which can be adjusted by actuation of a solenoid 18. In the event of an intended high working pressure and the associated high target limit pressure, the solenoid 18 is preferably associated with a pilot or relay valve, via which the target limit pressure at the pressure relief valve 16 can then be set indirectly electrohydraulically instead of directly electrically by actuating the pilot valve. The electromagnetic direct actuation of the pressure relief valve 16 shown in FIG. 2, on the other hand, is appropriate in the case of a lower intended pressure range and the associated lower target limit pressure.

The drive 1 has a hydrostatic work consumer 20 configured as a hydraulic cylinder in the exemplary embodiment shown. To supply the pressure medium, the working line 6 is connected to the hydraulic cylinder 20 via a control valve block 22.

In intended operation, the drive machine 2 rotates in a constant direction of rotation, which is symbolized by n=+ in FIG. 1.

The hydraulic machines 4, 8 are both configured with adjustable displacement volume. For this purpose, as shown in FIG. 1, they each have an electrohydraulic adjustment unit 24, 26, from which a swashplate determining the respective displacement volume of the hydraulic machines 6, 8 is linked.

The hydraulic machines 4, 8 are configured with a displacement volume that can be pivoted, so that a volume flow reversal is enabled despite a consistent connection to the working line 6 and the pressure medium sink T, in particular for reversing the direction of travel and for transitioning from the traction operation to crawl operation and vice versa (i.e., during acceleration and deceleration).

The change in flow direction and torque direction on the output associated with reversing and the transition are outlined in FIG. 1.

The drive 1 has a control unit 28 for control purposes, which is signal-connected to at least the electrohydraulic adjustment units 24, 26, the solenoid 18 of the pressure relief valve 16, and the control valve 22.

Figure 2:
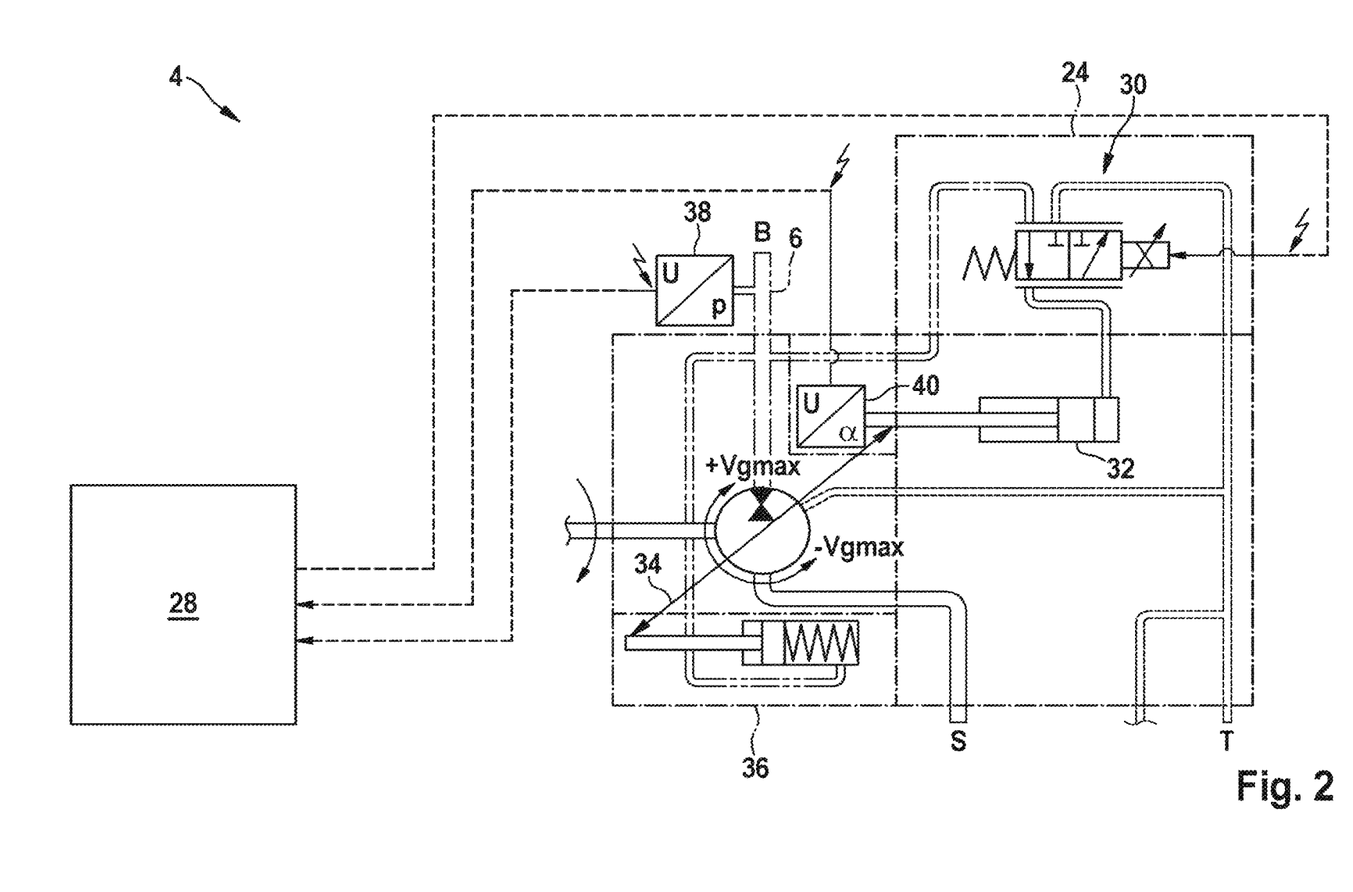
FIG. 2 schematically shows a hydraulic machine operating in the traction mode of the drive according to FIG. 1 as a hydraulic pump, according to one embodiment of the present disclosure.

FIG. 2 shows a more detailed representation of the first hydraulic machine 4 operating as a hydraulic pump in the intended traction operation. The following considerations also apply to the second hydraulic machine 8, with the difference that its drive shaft is coupled to the transmission 14 and the drive shaft of the first hydraulic machine 4 is coupled to the drive machine 2.

According to FIG. 2, the electrohydraulic adjustment unit 24 has an electromagnetically actuatable valve 30 that can be actuated by the control unit 28 having a pressure port connected to the working line 6 and having a tank port connected to the pressure medium sink T. Furthermore, the valve 30 has a port connected to a set pressure space of an adjustment cylinder 32 of the electrohydraulic adjustment unit 24.

In an un-powered state, a valve body of valve 30 is loaded by a spring to an end position in which working line 6 is connected to a set pressure space of adjustment cylinder 32. When the valve 30 is actuated electromagnetically, the set pressure space is connected to the low pressure T. Intermediate positions are possible in which the set pressure space is connected to both the working line 6 and the low pressure T.

Alternatively, the valve 30 of the electrohydraulic adjustment unit 24 may be configured inverted, that is, the valve body of the valve 30 is loaded by the spring in an end position in an un-powered state, in which the pressure medium sink T is connected to the set pressure space of the adjustment cylinder 32, whereas upon electromagnetic actuation of valve 30, the set pressure space is connected to working line 6.

Intermediate positions in which the set pressure space is connected to both the working line 6 and the low pressure T are of course possible in both variants, for example by means of a negative overlapping or underlapping of control edges.

The set pressure space of the actuator cylinder 32 is limited by an actuating piston from which the swashplate 34 of the first hydraulic machine 4 is loaded in the un-powered state of the valve 30 towards a (negative) maximum displacement volume $-V_{gmax}$. The $-V_{gmax}$ value is defined in the present exemplary embodiment for the hydraulic machine 4 operating in motor operation, such that the maximum negative flow rate Q-max is decreased for a given direction of rotation and speed of the drive machine 2 from the hydraulic machine 4.

The $+V_{gmax}$ value in the present exemplary embodiment is defined differently for the hydraulic machine 4 operating in pump operation, such that the maximum positive flow rate Q+max is provided by the hydraulic machine 4 for a given direction of rotation and speed of the drive machine 2.

A spring-loaded counter-piston of an electro-independent, hydraulic-mechanical adjustment unit 36 engages with the swash plate 34 in opposite directions of adjustment. Its set pressure space is permanently connected to the working line 6. The adjustment units 24, 36 act in the un-powered state as a function of the working pressure in the working line 6, such that above a system-specific working pressure, which depends on the piston area ratio, the spring force of the adjustment unit 36 and the speed, the electrohydraulic adjustment unit 24 adjusts the displacement volume Vg in the direction of positive maximum+$V_{gmax}$, and below this working pressure, the adjustment unit 36 adjusts the displacement volume Vg in the direction of negative maximum−$V_{gmax}$.

The drive 1 has a pressure sensor 38 connected to the working line 6 and a pivoting angle sensor 40 coupled to the swashplate 34 for control and/or regulation via the control unit 28.

Figure 3:
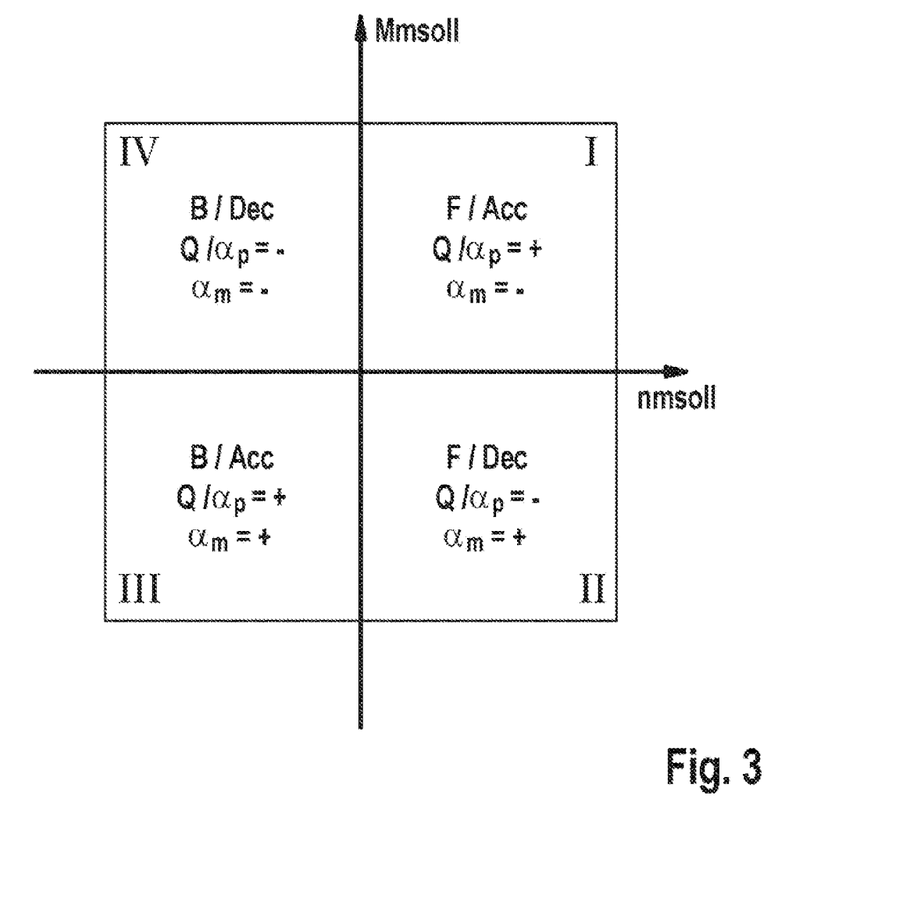
FIG. 3 shows possible operating quadrants of the drive according to the figures.

FIG. 3 shows possible operating quadrants of the drive 1. In the travel operation, the hydraulic machines 4, 8 are divided into four quadrants I-IV.

The first operating quadrant I is an accelerating forward travel at positive target drive speed nm and positive target torque Mm (+) of the second hydraulic machine 8 ("drive"). Here, the flow rate Q, or the pump pivoting angle ap, is positive (+) and a pivoting angle on the second hydraulic machine 8 is negative (−).

The second operating quadrant II is the decelerating forward travel at the positive target drive speed nm (+) but negative (−) target torque Mm (braking). The flow rate Q, or the pump pivoting angle aP, is negative (−) and the motor pivoting angle is positive (+).

The third operating quadrant III is an accelerating reverse travel with nm (−), Mm (−), Q, or aP (+) and am (+).

The fourth operating quadrant IV is a decelerating reverse travel with nm (−), Mm (+), Q, or aP (−) and am (−).

Figure 4:
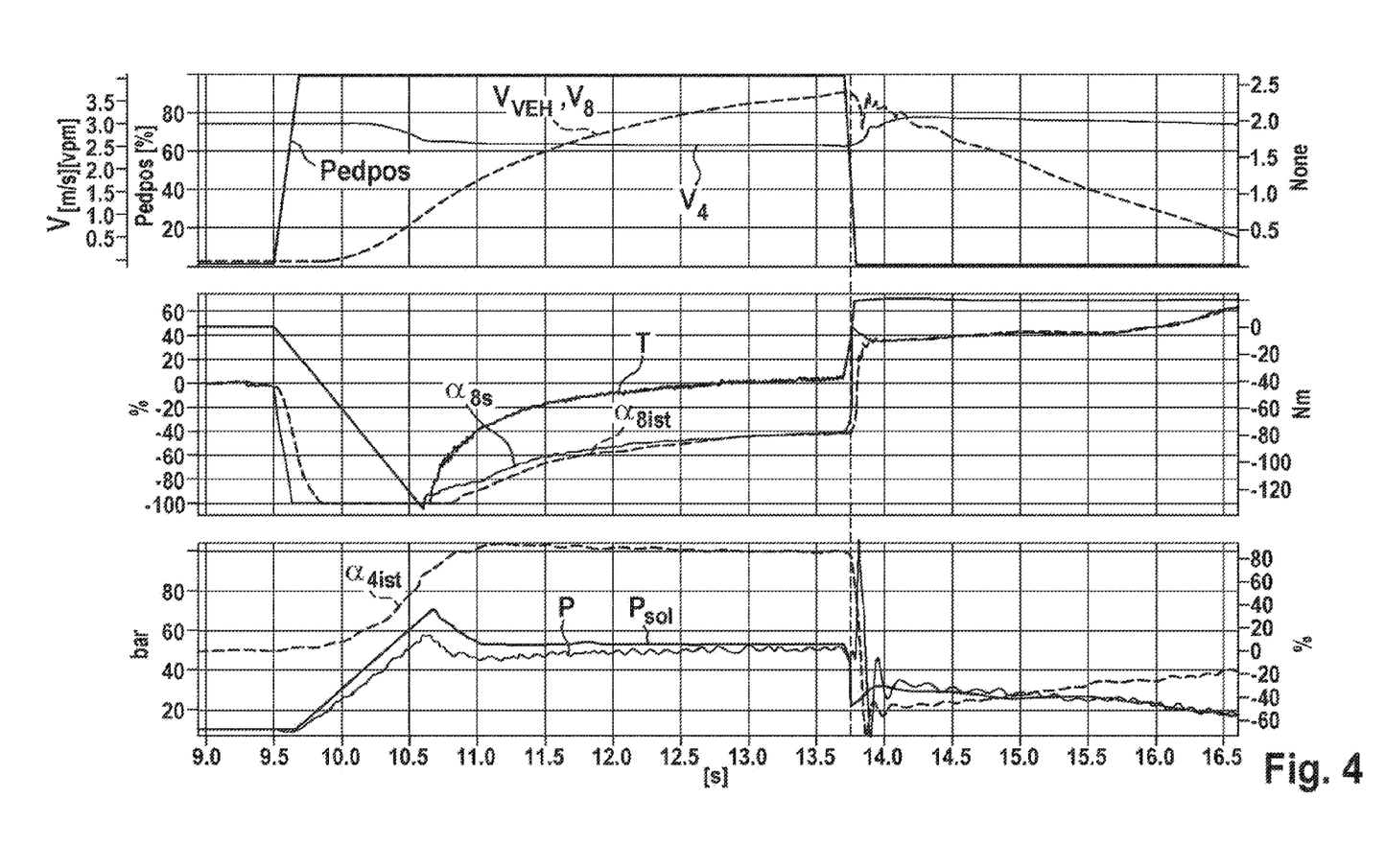
FIG. 4 shows the behavior of a conventional drive when reversing or decelerating.

FIG. 4 shows a curve of various sizes when reversing or decelerating the traction drive. In particular, during reversing or decelerating, the direction of torque on the second hydraulic machine 8 must be changed. This is done by pivoting the adjustment unit 26 in the inverted direction, which changes the direction of flow of the fluid.

For example, when changing from acceleration to deceleration of the vehicle, the fluid on the output-side unit is no longer drawn from the common working line 6 between the first and second hydraulic machines 4, 8 and conveyed into the tank line, but drawn from this tank line and conveyed into the common working line 6. In this state, the second hydraulic machine 8 changes from motor operation to pump operation. Failure to operate the unit properly may result in damage.

As shown in FIG. 4, the traction drive travels forward at a positive speed $v_{veh}$ which increases gradually. The position of the actuating element, in particular the pedal $Ped_{pos}$, is kept constant up to the second 13.7. It is clear to those skilled in the art that this disclosure may also function with a different actuating element for operating the traction drive. The rotational speed V4 of the first hydraulic machine 4 is substantially constant up to the second 13.7. As shown in the lower portion of FIG. 4, both the pivoting angle $a_{4ist}$ of the first hydraulic machine 4 and the pressure P generated by the first hydraulic machine 4 remain relatively constant up to the second 13.7.

In this embodiment, the second hydraulic machine 8 is torque-controlled and pivoting angle-controlled via the control unit 28 and the adjustment unit 26 associated therewith. The torque specification T of the second hydraulic machine 8 lowers relatively slowly up to second 13.7, because the torque specification T is dependent on the ground speed $v_{veh}$ (for a constant actuation of the travel pedal, the absolute value of the torque specification T will gradually decrease or decline with the driving speed $v_{veh}$).

As shown in the upper portion of FIG. 4, for the second 13.7, the driver changes the position of the pedal $Pedp_{oS}$ to cause the traction drive to brake. For this reason, the control unit 28 senses that the desired torque has changed and the control unit 28 generates a new torque specification T and sends a signal to both adjustment units 24, 28.

In a further development, the method comprises a further step in which a change of the hydraulic machines from a motor operation to a pump operation and/or a zero passage of the displacement volumes is predicted and/or sensed.

Due to the signal received, the second hydraulic machine 8 goes from a start pivoting angle to a target pivoting angle, wherein the sign of the start pivoting angle is inverse to the sign of the target pivoting angle. In the exemplary embodiment shown in FIGS. 1 and 2, the start pivoting angle is negative and the target pivoting angle is positive. However, it may also be reversed in another exemplary embodiment. At the same time, the pivoting angle $a_{4ist}$ of the first hydraulic machine 4 is also pivoted towards 0 (because the target pressure $P_{sol}$ of the first hydraulic machine 4 is lowered).

The inventor has observed that the pivoting angle speed (i.e., the speed at which the pivoting angle pivots) of the second hydraulic machine 8, which in this embodiment is dependent on the torque specification T, affects cavitation because too high a pivoting angle speed causes too much acceleration of the pressure medium. In particular, as shown in the lower portion of FIG. 4, first the pressure P generated by the first hydraulic machine 4 increases as the pivoting angle $a_{8ist}$ of the second hydraulic machine 8 is pivoted towards 0 and the pressure medium accumulates in the working line 6. However, if the pivoting angle $a_{4ist}$ of the first hydraulic machine 4 has pivoted above 0, the pressure will suddenly drop, resulting in cavitation. The value of the pressure P will then stabilize to a certain value over time.

Figure 5:
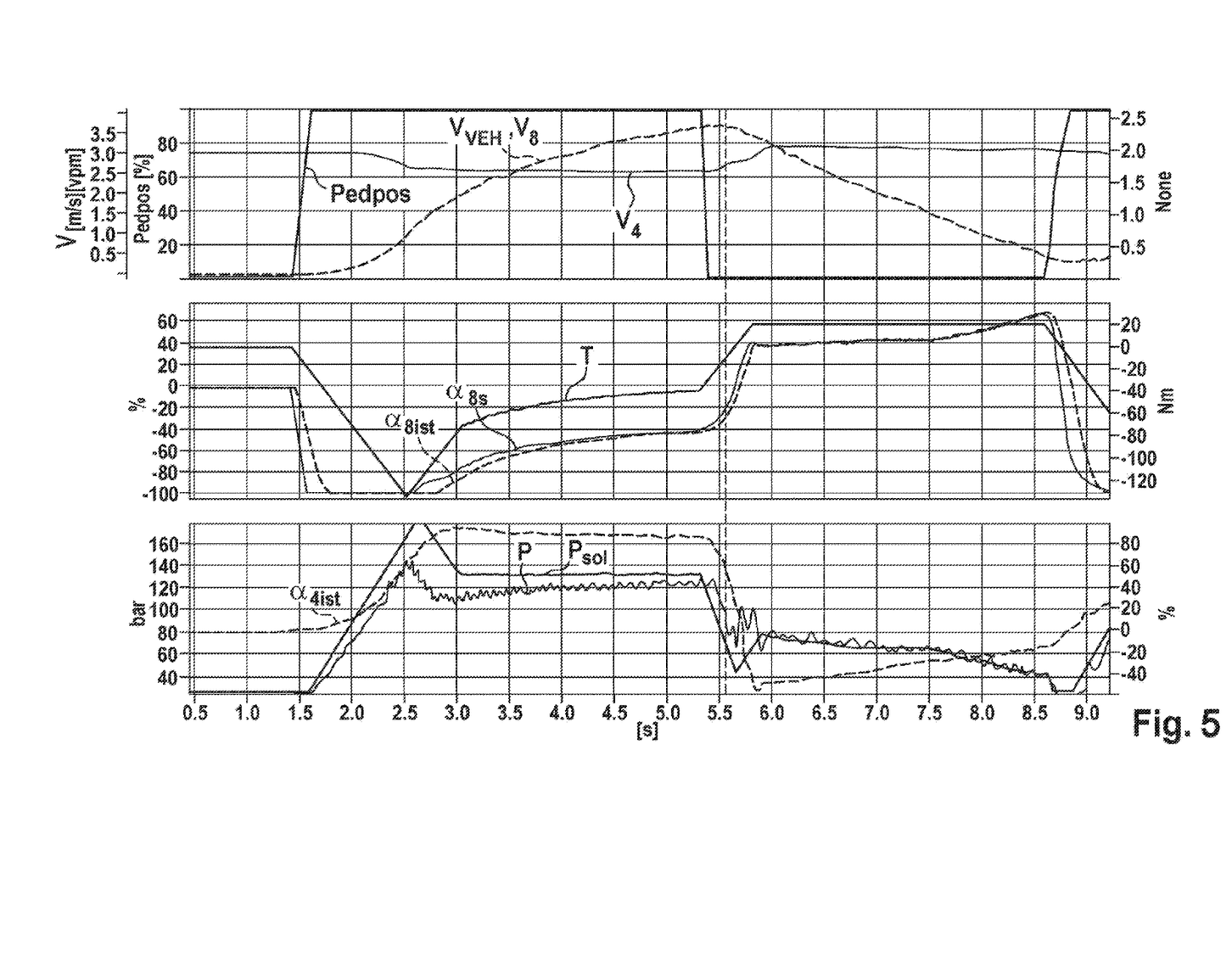
FIG. 5 shows the behavior of the drive according to the disclosure according to FIGS. 1 to 4 when reversing or decelerating.

For this reason, the disclosure includes a method for controlling the drive to prevent this instability. In particular, as shown in FIG. 5, according to an embodiment of the present disclosure, a limitation of the pivoting speed of the pivoting angle $a_{8ist}$ of the second hydraulic machine 8 has been made (as can be seen in the course of $a_{8ist}$).

The limitation takes place in particular in an angular, travel or time interval on both sides of the respective zero displacement volume, in particular when the respective hydraulic machine changes from motor operation to pump operation, as there would be a risk of cavitation when the pressure medium is drawn in if the change is too dynamic.

By this limitation, the maximum pivoting speed $a_{8ist}$ of the pivoting angle of the second hydraulic machine 8 is limited by not exceeding a predefined value.

In particular, because in this embodiment the second hydraulic machine 8 is torque-controlled by the control unit 28 and the adjustment unit 26 associated therewith, this pivoting angle speed is executed by limiting the torque specification T.

With this solution, as shown in the lower portion of FIG. 5, the pressure P generated by the first hydraulic machine 4 is decreased more slowly, as the pivoting angle $a_{8ist}$ of the second hydraulic machine 8 is pivoted towards 0 by means of the limitation described, and at the same time the pivoting angle $a_{4ist}$ of the first hydraulic machine 4 is pivoted towards 0.

In particular, in a particular embodiment, the control unit 28 will limit control of the pivoting angle of the second hydraulic machine 8 between the start pivoting angle and the target pivoting angle, such that the torque specification T, in particular a torque specification gradient, of the second hydraulic machine 8 follows a predefined curve.

The target pivoting angle of the second hydraulic machine is selected to be $v_{veh}$ as a function of the travel speed. Preferably, the higher the driving speed $v_{veh}$, the smaller the absolute value of the target swivel angle. This solution effectively reduces the risk of cavitation. With this solution, the displacement volume Vgp, Vgm is limited to a limit within a time interval extending around the change.

It has been found in connection with the target speed that it is particularly advantageous to increase the working pressure P of the working line 6. With this solution, the working pressure P of the working line 6 is increased within a time interval extending around the change relative to the working pressure outside of that interval. By increasing the pressure, the angle may be smaller to regulate the same torque. As a result, less amount is conveyed while the braking torque is constant, and thus less fluid is also accelerated when changing from motor to pumping operation.

While the present disclosure has been described with reference to the embodiments described above, it is clear to those skilled in the art that it is possible to realize various modifications, variations and improvements of the present disclosure in light of the teaching described above and within the scope of the appended claims without departing from the scope of the disclosure.

In particular, it has been written in the description that the first hydraulic machine 4 is pressure-controlled via the control unit 28 and the associated adjustment unit 24, wherein the working pressure p results from a maximum value of the requirements of travel and working hydraulics. In another exemplary embodiment, the first hydraulic machine may be torque-controlled. In this case, the limitation method may also be used on the first hydraulic machine 4, which is pivoted from a motor operation to a pump operation.

Accordingly, the disclosure is not intended to be limited by the specific illustrative embodiments.

The invention claimed is:

1. A method for controlling a drive to firstly change one of a first hydraulic machine and a second hydraulic machine from pump operation to motor operation and to secondly change the other of the first hydraulic machine and the second hydraulic machine from motor operation to pump operation, wherein
   the first hydraulic machine is configured to couple to a drive machine,
   the second hydraulic machine is configured to couple to an output,
   the first and second hydraulic machines are fluidically connected to one another via a working line and connected to a pressure medium sink,
   each of the first and second hydraulic machines is configured to provide a respective displacement volume that is adjustable to zero and to values above and below zero, and
   each of the first and the second hydraulic machines is operably connected to a respective electrohydraulic adjustment unit that is connectable to the working line and to the pressure medium sink, the method comprising:
   controlling the one of the first and second hydraulic machines so that a pivoting angle moves from a start pivoting angle toward a target pivoting angle,
   wherein (i) the start pivoting angle is positive and the target pivoting angle is negative, or (ii) the start pivoting angle is negative and the target pivoting angle is positive, and
   wherein the one of the first and second hydraulic machines is controlled throughout an angular interval, a travel interval, or a time interval, before and after passing through the respective zero displacement volume of the one of the first and second hydraulic machines as the pivoting angle moves from the start pivoting angle toward the target pivoting angle, such that a pivoting speed of the pivoting angle of the one of the first and second hydraulic machines does not exceed a predefined value.

2. The method according to claim 1, wherein the control of the pivoting speed of the pivoting angle of the one of the first and second hydraulic machines is performed between the start pivoting angle and the target pivoting angle by limiting a torque specification of the one of the first and second hydraulic machines.

3. The method according to claim 2, wherein a control unit controls the pivoting angle between the start pivoting angle and the target pivoting angle such that the torque specification follows a predefined curve.

4. The method according to claim 2, wherein the torque specification is limited such that a torque specification gradient is limited.

5. The method according to claim 1, further comprising:
   selecting the target pivoting angle as a function of travel speed.

6. The method according to claim 1, further comprising:
   prior to the controlling of the other hydraulic machine, predicting and/or sensing a change of the other hydraulic machine from motor operation to pump operation.

7. The method according to claim 1, further comprising:
   during the controlling of the pivoting angle, controlling, with a control unit, the respective electrohydraulic adjustment unit of at least one of the first and second hydraulic machines such that a working pressure of the working line is increased within the angular interval, the travel interval, or the time interval, relative to the working pressure outside of the time interval.

8. The method according to claim 7, wherein the respective electrohydraulic adjustment unit of the at least one of the first and second hydraulic machines is controlled via the control unit, such that the respective displacement volume is limited to a limit within the angular interval, the travel interval, or the time interval.

9. The method according to claim 1, wherein the drive is a traction drive.

* * * * *